(12) United States Patent
Cheong

(10) Patent No.: US 6,986,362 B2
(45) Date of Patent: Jan. 17, 2006

(54) PILOT OPERATED RELIEF VALVE

(75) Inventor: Hae Kyun Cheong, Pusan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 10/862,865

(22) Filed: Jun. 7, 2004

(65) Prior Publication Data

US 2005/0183775 A1    Aug. 25, 2005

(30) Foreign Application Priority Data

Feb. 25, 2004  (KR) ...................... 10-2004-0012697

(51) Int. Cl.
*F16K 17/10* (2006.01)
*F16K 17/06* (2006.01)
*F16K 31/124* (2006.01)
*F15B 11/028* (2006.01)

(52) U.S. Cl. .................. 137/491; 137/492.5; 137/495; 251/28; 251/63.6; 251/282

(58) Field of Classification Search ................ 137/491, 137/492, 492.5, 495, 601.13; 251/28, 63, 251/63.5, 282, 63.6
See application file for complete search history.

(56) References Cited

U.S. PATENT DOCUMENTS 6,644,346 B1 * 11/2003 Conrads et al. ............. 137/491

FOREIGN PATENT DOCUMENTS

| JP | 52070424 A | * | 6/1977 |
| JP | 57-065467 | | 4/1982 |
| JP | 05280653 A | * | 10/1993 |
| JP | 11-072172 | | 3/1999 |
| JP | 11-132347 | | 5/1999 |

OTHER PUBLICATIONS

Patent Abstracts of Japan of JP 11-132347 dated May 21, 1999.
Patent Abstracts of Japan of JP 11-072172 dated Mar. 16, 1999.
Patent Abstracts of Japan of JP 57-065467 dated Apr. 21, 1982.

* cited by examiner

*Primary Examiner*—Ramesh Krishnamurthy
(74) *Attorney, Agent, or Firm*—Ladas and Parry LLP

(57) ABSTRACT

Disclosed is a pilot operated relief valve, in which a balance system is provided to offset a tank pressure exerted on a piston, so that a setting pressure of a pilot poppet is not changed even when the tank pressure is changed, and thus a function of the relief valve can be stably performed. The pilot operated relief valve is comprised of a sleeve, a main poppet provided to be movable in the sleeve, a seat provided in the sleeve, a housing connected to a rear end of the sleeve, a pilot poppet provided to be movable in the housing, a piston moved by a pilot signal pressure, and the balance system offsetting the tank pressure exerted on the piston.

4 Claims, 3 Drawing Sheets

PILOT OPERATED RELIEF VALVE

BACKGROUND OF THE INVENTION

1. Field of the Invention

The present invention relates to a relief valve, and more particularly to a pilot operated relief valve, in which a balance system is provided to offset tank pressure exerted on a piston, so that setting pressure of a pilot poppet is not changed even when the tank pressure is changed, and thus a function of the relief valve is stably performed.

2. Description of the Related Art

In general, heavy equipment such as an excavator, a payloader, a skidder, etc., which is operated with hydraulic pressure employs a hydraulic system in order to drive various working tools mounted thereon by use of hydraulic fluid supplied from a hydraulic pump.

Hydraulic fluid is supplied from a hydraulic pump to actuators of each working tools by means of a main control valve which performs a function of direction control. The main control valve is provided therein with a relief valve, which is referred to as a "main relief valve" and performs a function of regulating the maximum pressure in order to protect the entire hydraulic system including a driving source from an overload.

The relief valve is one of pressure control valves, which discharge a part or total of fluid when the pressure of the hydraulic system reaches a setting pressure of the relief valve, thereby performing a function of keeping the pressure in the hydraulic system under a set value. The relief valve is capable of changing the setting pressure, so that it can cope with the case of changing the actuator used in the equipment.

Meanwhile, in the case of typical relief valves, it is inconvenient for the user to change the setting pressure through direct observation of a pressure gauge outside. For this reason, a pilot operated relief valve is mainly used in the main relief valve provided in the main control valve.

When the heavy equipment such as the excavator performs excavating operation by use of a bucket, or swiveling operation by means of a swiveling motor, or traveling operation by means of traveling motor, there occurs a phenomenon that the pressure of the hydraulic system is insufficient to perform the operation. Thus, recently, the setting pressure of the pilot operated relief valve is divided into two steps. Further, the setting pressure of the pilot operated relief valve is temporarily increased when operation requiring a great load is performed. Thereby, excavating capability, traveling capability, swiveling capability, etc. of the heavy equipment are improved.

The setting pressure of a pilot operated relief valve is freely changed by the pilot signal pressure. When the pilot signal pressure applied to the pilot operated relief valve is adjusted outside or at a driver's seat, the setting pressure of the pilot operated relief valve is automatically changed in response to the adjustment.

FIG. 1 is a cross-sectional view of a conventional pilot operated relief valve. According to the conventional pilot operated relief valve, hydraulic fluid supplied from a hydraulic pump 200 drives a working tool (not shown) of heavy equipment via a relief valve 100. When an actuator (not shown) of the working tool reaches the maximum stroke, the hydraulic fluid is returned to a tank 201 via the relief valve 100.

The relief valve 100 is comprised of a sleeve 110 and a main body 180 coupled to the sleeve 110.

The sleeve 110 is provided therein with a main poppet 120, a main poppet spring 122, a second orifice body 130, and a seat 140. The main poppet 120 is provided with a first orifice 121 at a central portion thereof, and is fitted to be movable in a longitudinal direction in the sleeve 110. The main poppet spring 122 resiliently supports the main poppet 120.

Further, the main poppet spring 122 has a rear end supported by the second orifice body 130. The second orifice body 130 is installed so that its rear end is supported by the seat 140. The second orifice body 130 is provided with a second orifice 131 which passes through the central portion of the second orifice body 130.

The seat 140 is provided with a seat fluid channel 142 which passes through the seat 140 and is connected with the second orifice 131, and a seat surface 141 which is formed on a rear end of the seat fluid channel 142 in a tapered form.

The main body 180 coupled with the sleeve 110 is provided therein with a pilot poppet 150, a pilot poppet spring 160, and a piston 170. The pilot poppet 150 is resiliently supported by the pilot poppet spring 160, and is provided to be movable in a longitudinal direction. The pilot poppet spring 160 is supported by the piston 170 on a rear end thereof.

The pilot poppet 150 takes a conical shape, and is brought into contact with the seat surface 141 of the seat 140 by a spring force of the pilot poppet spring 160, thus functioning to open/close the seat fluid channel 142.

The piston 170 supporting the pilot poppet spring 160 is slidably fitted in the main body 180. On the left side of the main body 180, a pilot signal line 190 is formed and connected with a rear surface of the piston 170. The pilot signal line 190 is supplied with a pilot signal pressure Pi from the outside, and presses the piston 170 to move the piston 170 to the left or right. The rear surface of the piston 170 is provided with a back pressure chamber 171 on which the pilot signal pressure Pi is exerted.

As the piston 170 and the pilot poppet spring 160 is pressed to the right side by the pilot signal pressure Pi inputted through the pilot signal line 190, the spring force of the pilot poppet spring 160 is changed to set up the setting pressure of the relief valve 100.

The sleeve 110 is provided with a high-pressure inlet 111 into which the hydraulic fluid from the hydraulic pump 200 is supplied, and a tank fluid channel 112 which returns the hydraulic fluid of the high-pressure inlet 111 to the tank 210. Thus, when the main poppet 120 moves to the left in the sleeve 110, the hydraulic fluid of the high-pressure inlet 111 is returned to the tank 201 via the tank fluid channel 112.

Hereinafter, a pressure exerted on the side of the high-pressure inlet 111 by the hydraulic fluid from the hydraulic pump 200 is referred to as a "inlet side pressure," and a pressure exerted on a space 120a of the main poppet 120 before the hydraulic fluid passing through the first orifice 121 of the main poppet 120 is introduced into the second orifice 131 is referred to as a "chamber side pressure."

The main poppet 120 is designed so that a pressure receiving area of the high-pressure inlet 111 on which the inlet side pressure is exerted is smaller than that of the space 120a on which the chamber side pressure is exerted.

The following description will be made regarding an operation of the pilot operated relief valve 100 as constructed above. The hydraulic fluid from the hydraulic pump 200 is introduced into the space 120a of the main poppet 120 via the high-pressure inlet 111 and the first orifice 121.

When the inlet side pressure is lower than the setting pressure set by the pilot poppet spring 160, the pilot poppet 150 is brought into contact with the seat surface 141 by the spring force of the pilot poppet spring 160. Hence, the hydraulic fluid of the space 120a does not flow into the second orifice 131, so that the inlet side pressure is maintained to be equal to the chamber side pressure.

As set forth above, the main poppet 120 is designed so that the pressure receiving area on which the inlet side pressure is exerted is smaller than the pressure receiving area on which the chamber side pressure is exerted, the main poppet 120 is supported toward the right side in the sleeve 110 by the main poppet spring 122. Thus, the tank fluid channel 112 is kept closed by the main poppet 120.

Meanwhile, when the working tool (not shown) of the heavy equipment reaches the maximum stroke, a system pressure of the heavy equipment is increased. Thus, the pressure on the side of the high-pressure inlet 111 is increased, so that both the inlet side pressure and the chamber side pressure reaches a pressure higher than the setting pressure set by the pilot poppet spring 160. At this time, the hydraulic fluid reacts against the spring force of the pilot poppet spring 160 to move the pilot poppet 150 to the left side, so that the seat fluid channel 142 of the seat 140 is opened.

Therefore, since the hydraulic fluid is returned to the tank 201 via the seat fluid channel 142 and the tank inlet 181, the hydraulic fluid introduced into the space 120a through the first orifice 121 is subjected to resistance. As a result, the chamber side pressure becomes lower than the inlet side pressure. If so, the force applied to the pressure receiving surface of the main poppet 120 on which the inlet side pressure is exerted exceeds the force applied to the pressure receiving surface of the main poppet 120 on which the chamber side pressure is exerted. Accordingly, the main poppet 120 moves to the left side, and the hydraulic fluid is returned through the tank fluid channel 112 to the tank 201.

FIG. 2 is a characteristic diagram showing a relation between pilot signal pressure of a conventional pilot operated relief valve and system pressure.

In the pilot operated relief valve 100, when the inlet side pressure is increased over the setting pressure, the hydraulic fluid is returned to the tank 201, thus performing a relief function.

When the pilot signal pressure Pi is in an off state, the piston 170 does not press the pilot poppet spring 160. Thus, the setting pressure of the relief valve 100 is set to a low pressure, i.e., a first setting pressure. Only when the pressure supplied from the hydraulic pump 200 to the high-pressure inlet 111 is higher than the first setting pressure set by the pilot poppet spring 160, the main poppet 120 is operated. Thus, the setting pressure of the hydraulic system is maintained to be suitable for general operation in which a great load is not required.

By contrast, when the pilot signal pressure Pi is supplied to the pilot signal line 190, the piston 170 compresses the pilot poppet spring 160. Thus, the setting pressure of the relief valve 100 is set to a high pressure, i.e., a second setting pressure. Only when the pressure supplied from the hydraulic pump 200 to the high-pressure inlet 111 becomes higher than the second setting pressure set by the pilot poppet spring 160, the main poppet 120 is operated. Thus, the setting pressure of the hydraulic system is maintained to be suitable for operation, such as excavating, swiveling, traveling, etc., for which a great load is required.

As set forth above, the pilot signal pressure Pi inputted into the pilot signal line 190 variably changes the setting pressure of the relief valve 100. More specifically, the pilot signal pressure Pi presses the piston 170, and thus a compression length of the pilot poppet spring 160 is changed. Thereby, the spring force of the pilot poppet spring 160 is changed, so that the setting pressure is changed.

However, the pressure caused by the pilot signal pressure Pi, the spring force caused by the pilot poppet spring 160, and a tank pressure applied by the tank inlet 181 are applied to the both opposite sides of the piston 170 as an action force.

On assuming that the signal pressure receiving area of a back pressure chamber 171 to which the pilot signal pressure Pi is applied is denoted by Dp, the spring force of the pilot poppet spring 160 by Fs, the tank pressure applied to the tank inlet 181 by Pt, and the pressure receiving area of the tank pressure of the piston 170 by Dt, a relation of the action forces exerted on the piston is expressed as follows.

$$Pi \times Dp = Fs + (Pt \times Dt) = \text{Setting pressure}$$

According to the relation, the setting pressure of the relief valve 100 is influenced by the tank pressure Pt. In other words, even when the pilot signal pressure Pi is set to a constant pressure, the tank pressure may be changed within a predetermined pressure range. In this case, pulsation is generated as shown in FIG. 2. If performance of the relief valve is deteriorated due to this phenomenon, the operation capability of the working tool is lowered, which may have adverse effects on the overall reliability of the equipment.

There has been an urgent demand for a technique of the pilot operated relief valve whose function can be stably performed with the setting pressure not being influenced by the tank pressure change.

SUMMARY OF THE INVENTION

To solve the foregoing problems, the present invention is directed to provide a pilot operated relief valve, in which a balance system is provided to offset a tank pressure exerted on a piston so that a setting pressure of a pilot poppet is not changed even when the tank pressure is changed.

To achieve the above objective, the present invention provides a pilot operated relief valve comprising: a sleeve provided with a high-pressure inlet to which hydraulic fluid from a pump is supplied, and a tank fluid channel through which the hydraulic fluid of the high-pressure inlet is returned to a tank; a main poppet provided in the sleeve so as to be communicated with the high-pressure inlet in a front thereof to allow the hydraulic fluid to be introduced into a back pressure chamber provided in a rear thereof, and to be resiliently supported by a main poppet spring to open/close the high-pressure inlet and the tank fluid channel; a seat provided with a seat fluid channel communicated with the back pressure chamber and provided in the sleeve; a housing provided with a signal inlet into which a pilot signal pressure is inputted and a tank inlet communicated with the tank fluid channel, and connected to the sleeve so as to be communicated with the seat fluid channel on a front end thereof; a pilot poppet resiliently supported to be movable in the housing by a pilot poppet spring, and provided to open/close the tank inlet and the seat fluid channel on a front end thereof; a piston movably provided in the housing to support a rear end of the pilot poppet spring, and pressing the pilot poppet spring by means of the pilot signal pressure inputted at the signal inlet; and a balance system having a balance chamber which is provided in a front of the piston within the housing and is connected with the tank fluid channel, a balance fluid channel passing through a center of the piston, and a balance back chamber communicated with the balance chamber through the balance fluid channel, and offsetting the tank pressure exerted on the piston.

Preferably, the piston has an outer circumference provided with a signal receiving surface on which the pilot signal pressure from the signal inlet is exerted. The housing is therein provided with a piston spring resiliently supporting the piston against the pilot signal pressure. The balance back chamber is defined by a rear pressure receiving surface of the piston and an rear inner wall of the housing. The balance chamber comes into contact with a front pressure receiving surface of the piston. And, the front pressure receiving surface of the piston has the same area as the rear pressure receiving surface of the piston.

Here, the piston has a rear surface provided with a signal receiving surface on which the pilot signal pressure from the signal inlet is exerted. The balance back chamber is defined by a rear pressure receiving surface formed by a step of an outer circumference of the piston and an inner side wall of the housing. The balance fluid channel includes a vertical fluid channel communicated with the balance back chamber and a central fluid channel which branches off from the vertical fluid channel to be communicated with the balance chamber. The balance chamber comes into contact with a front pressure receiving surface of the piston. And, the front pressure receiving surface of the piston has the same area as the rear pressure receiving surface of the piston.

Further, the piston has a rear end into which an auxiliary piston is movably inserted. The auxiliary piston has a rear end provided with a signal receiving surface on which the pilot signal pressure from the signal inlet is exerted. The balance back chamber is defined by a recess on a front end of the auxiliary piston and a rear pressure receiving surface of a rear surface of the piston. The balance chamber comes into contact with a front pressure receiving surface of the piston. And, the front pressure receiving surface of the piston has the same area as the rear pressure receiving surface of the piston.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
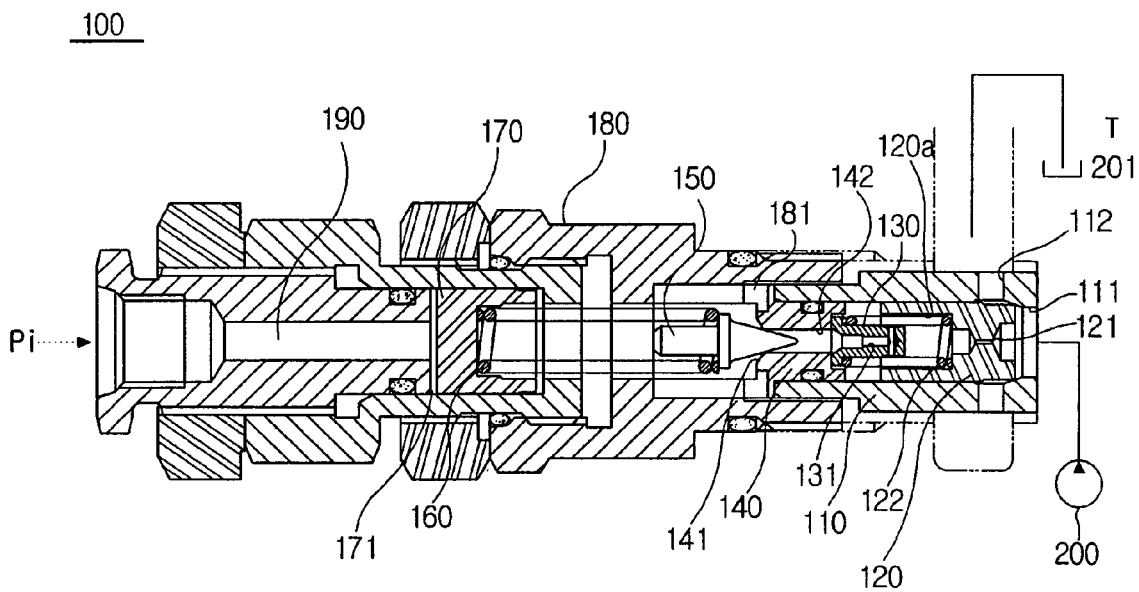
FIG. 1 is a cross-sectional view of a conventional pilot operated relief valve.
Figure 2:
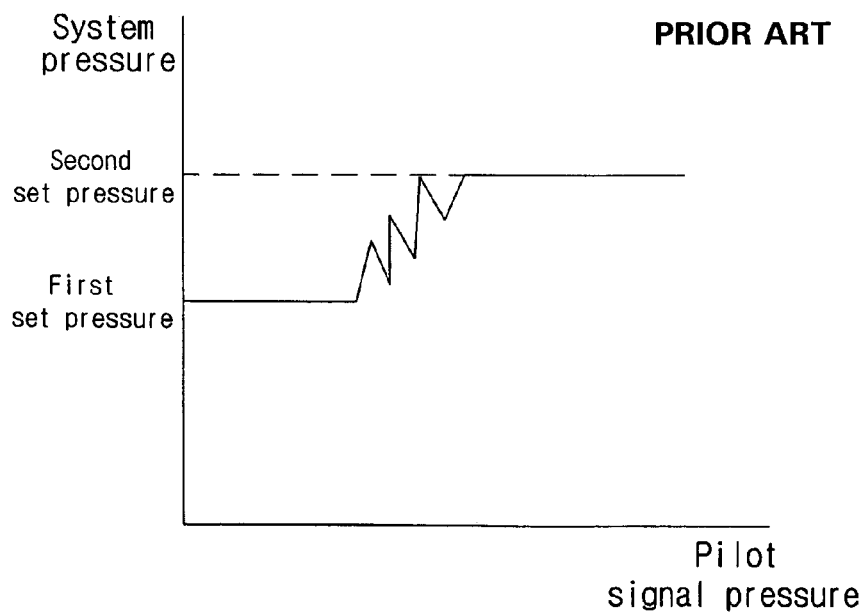
FIG. 2 is a characteristic diagram showing a relation between a pilot signal pressure of a conventional pilot operated relief valve and a system pressure.

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
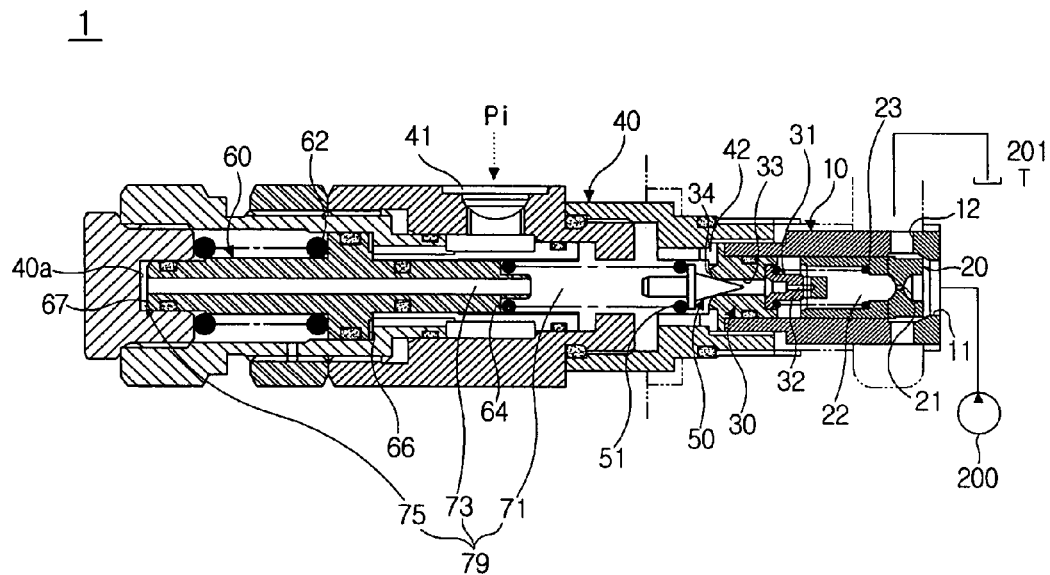
FIG. 3 is a cross-sectional view of a pilot operated relief valve according to a first embodiment of the present invention.

FIG. 3 is a cross-sectional view of a pilot operated relief valve 1 according to a first embodiment of the present invention.

The relief valve 1 is comprised of a sleeve 10, a main poppet 20 movably mounted on the sleeve 10, a seat 30 mounted on the sleeve 10, a housing 40 connected to a rear end of the sleeve 10, a pilot poppet 50 movably mounted on the sleeve 10, a piston 60 that is moved by a pilot signal pressure, and a balance system 79 for offsetting a tank pressure exerted on the piston 60.

The main poppet 20 of the relief valve 1 opens or closes a high-pressure inlet 11 to which hydraulic fluid from a hydraulic pump 200 is supplied and a tank fluid channel 12 connected to a tank 201.

Thus, the relief valve 1 serves to maintain a pressure of a whole hydraulic system below a certain value in such a manner that when a pressure of the high-pressure inlet 11 exceeds a setting pressure set by pilot signal pressure Pi, the main poppet 20 discharges hydraulic fluid of the high-pressure inlet 11 to the tank 201.

The sleeve 10 is mounted on the front end of the relied valve 1 and includes the tank fluid channel 12 and the high-pressure inlet 11 through which hydraulic fluid from the hydraulic pump 200 is supplied. The tank fluid channel 12 is connected with the high-pressure inlet 11 so as to discharge hydraulic fluid of the high-pressure inlet 11 toward the tank 201.

In the sleeve 10, the main poppet 20, a main poppet spring 23, a second orifice body 31 and the seat 30 are mounted one by one. The main poppet 20 is resiliently supported by the main poppet spring 23 and is movably mounted on the sleeve 10 so as to open or close the high-pressure inlet 11 and the tank fluid channel 12.

Thus, when the main poppet 20 is moved to the right side as seen from the Figure, the front end of the main poppet 20 closes the connection between the high-pressure inlet 11 and the tank fluid channel 12. Also, when the main poppet 20 moved to the left side as seen from the Figure, the high-pressure inlet 11 and the tank fluid channel 12 are connected with each other thus to discharge hydraulic fluid from the high-pressure inlet 11 to the tank fluid channel 12.

The main poppet spring 23 resiliently supporting the rear end of the main poppet 20 is supported by the second orifice body 31, which is supported by the seat 30. The rear end of the seat 30 is fixed to the sleeve 10 and the rear end of the second orifice body 31 is seated in the front end of the seat 30 thus to stably support the main poppet spring 23 so that the main poppet 20 being forced toward the high-pressure inlet 11 by the main poppet spring 23.

In the front of the main poppet 20, a first orifice 21 communicated with the high-pressure inlet 11 is formed. In the rear of the main poppet 20, a back pressure chamber 22 communicated with the first orifice 21 is formed. A second orifice 32 is formed in the center of the second orifice body 31 to communicate with the back pressure chamber 22. A seat fluid channel 33 is formed in the center of the seat 30 to communicate with the second orifice 32.

Thus, in the sleeve 10, a fluid channel extending through the first orifice 21, back pressure chamber 22, the second orifice 32 and the seat fluid channel 33 are provided in turn. Also, on the rear end of the seat 30, a seat surface 34 is formed to extend outside the seat fluid channel 33.

The rear end of the sleeve 10 is coupled to the housing 40 in which the pilot poppet 50, the piston 60 and a pilot poppet spring 51 are mounted to implement a function of presetting an operational pressure of the pilot operated relief valve 1.

The pilot poppet 50 is movably mounted on the housing in a state of being resiliently supported by the pilot poppet spring 51. The pilot poppet 50 takes a conical shape on its front end and is pressed by spring force of the pilot poppet spring 51 thus to contact with the seat surface 34 of the seat 30, therby opening or closing the seat fluid channel 33.

In the front of the housing 40, a tank inlet 42 communicated with the tank fluid channel 12 is formed. The pilot poppet 50 serves to connect/disconnect the tank inlet 42 and the seat fluid channel 33, by opening or closing of the seat fluid channel 33.

The piston 60 is slidably and movably mounted on the housing 40 while supporting the rear end of the pilot poppet spring 51. In the roughly middle side of the housing 40, a signal inlet 41 to which pilot signal pressure Pi is inputted from exterior is formed. A signal receiving surface 66 is formed at the outer circumference of the roughly central portion of piston 60. The signal receiving surface 66 is connected with the signal inlet 41 to receive pilot signal pressure Pi. Also, the rear end of the piston 60 is resiliently supported by a piston spring 62, which forces the piston 60 to the right side as seen from Figure in opposition to the pilot signal pressure Pi exerted on the signal receiving surface 66.

The balance system 79 is mounted on the housing 40 to offset a tank pressure exerted on the piston 60. The balance system 79 includes a balance chamber 71 formed in the front of the piston 60 to be connected with the tank fluid channel 12, a balance fluid channel 73 formed through the center of the piston 60, and a balance back chamber 75 communicated with the balance chamber 71 through the balance fluid channel 73.

The balance back chamber 75 is formed as a space defined by an rear inner wall 40a of the housing 40 and the piston 60. The balance chamber 71 is formed as a space in the front of the piston 60, on which the pilot poppet spring 51 and the pilot poppet 50 are mounted.

The balance back chamber 75 and the balance chamber 71 are connected with each other through the balance fluid channel 73 and the balance chamber 71 is connected with the tank fluid channel 12, so that hydraulic fluid supplied from the tank 201 via the tank fluid channel 12 is supplied to the balance back chamber 75 via the balance chamber 71 and the balance fluid channel 73. Accordingly, tank pressure is formed in the balance chamber 71 and the balance back chamber 75, so that both sides of the front and rear of the piston 60 respectively receive the same tank pressure.

Since exertion force applied to a surface by hydraulic pressure is proportion to a pressure receiving area, exertion forces applied to the front and rear sides of the piston 60 by the pressure can be equally formed by equalizing an area of a rear pressure receiving surface 67 of the piston 60 contacting the balance back chamber 75 and an area of a front pressure receiving surface 64 of the piston 60 contacting the balance chamber 71.

Even if tank pressure is changed, tank pressure exerted on the piston 60 is offset by the operation of the balance system 79. Thus, tank pressure does not affect the setting pressure of the pilot operated relief valve 1, which secures the function of relief valve.

Figure 4:
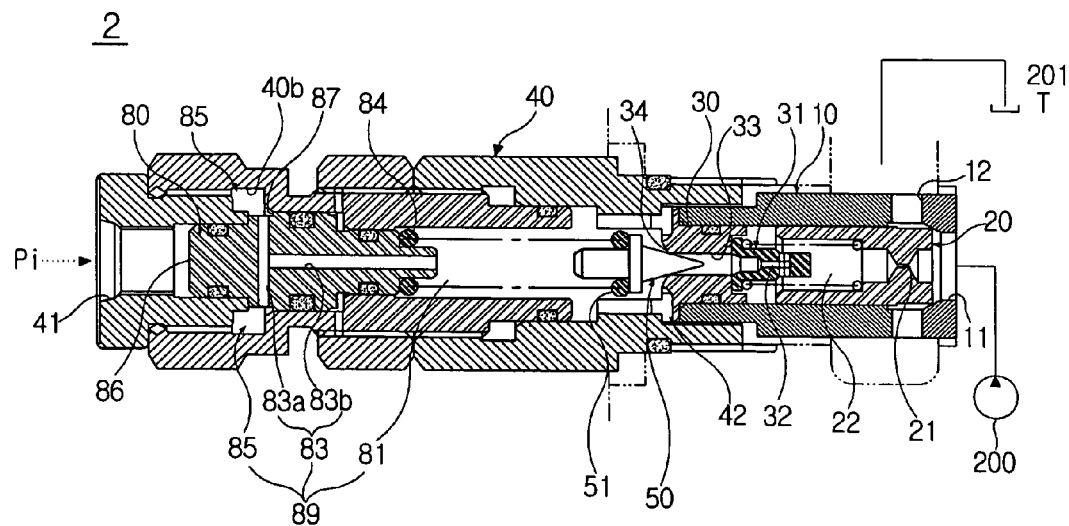
FIG. 4 is a cross-sectional view of a pilot operated relief valve according to a second embodiment of the present invention.

FIG. 4 is a cross-sectional view of a pilot operated relief valve 2 according to a second embodiment of the present invention. In the following description on the pilot operated relief valve according to the second embodiment of the present invention, repetition of the description on the same components as those of the first embodiment will be omitted.

The signal inlet 41 is mounted on a rear end of the housing 40 unlike the above-described first embodiment, so that a signal receiving surface 86 is formed on the rear surface of a piston 80 so as to receive pilot signal pressure Pi inputted from the signal inlet 41. When pilot signal pressure Pi is supplied to the signal receiving surface 86 of the piston 80, the piston 80 is moved to the right side in the housing 40 to press the pilot poppet spring 51 thus to change the setting pressure.

A balance system 89 is mounted on the housing 40 to offset tank pressure exerted on the piston 80. The balance system 89 includes a balance chamber 81 formed on the front surface of the piston 80 to be connected with the tank fluid channel 12, a balance fluid channel 83 passing through the center of the piston 80, and a balance back chamber 85 communicated with the balance chamber 81 through the balance fluid channel 83.

The balance back chamber 85 is formed as a space defined by the rear pressure receiving surface 87 formed to be stepped at outer circumference of the piston 80 and an inner side wall 40b of the housing 40. The balance fluid channel 83 formed inside the piston 80 is formed in the T shape which includes a vertical fluid channel 83a and a central fluid channel 83b. The vertical fluid channel 83a is formed in the vertical direction of the piston 80 so as to communicate with the back pressure chamber 85. The central fluid channel 83b branches off the vertical fluid channel 83a so as to communicate with the balance chamber 81 in front of the piston 80.

Since the balance chamber 81 is connected with the tank fluid channel 12, hydraulic fluid supplied from the tank 201 via the tank fluid channel 12 is suplied to the balance back chamber 85 via the balance chamber 81 and the balance fluid channel 83. Tank pressure is formed in the balance chamber 81 and the balance back chamber 85, so that both sides of the front and rear of the piston 80 respectively receive the same tank pressure.

In order that the front and rear sides of the piston 80 are applied with same exertion force by tank pressure, the rear pressure receiving surface 87 of the piston 80 contacting the balance back chamber 85 should be preferably formed such that an area thereof has the same dimension as that of the front pressure receiving surface 84 of the piston 80 contacting the balance chamber 81.

According to the above construction, even if tank pressure is changed, the balance system 89 offsets tank pressure exerted on the piston 80 so that tank pressure does not affect the setting pressure, which secures the function of relief valve.

Figure 5:
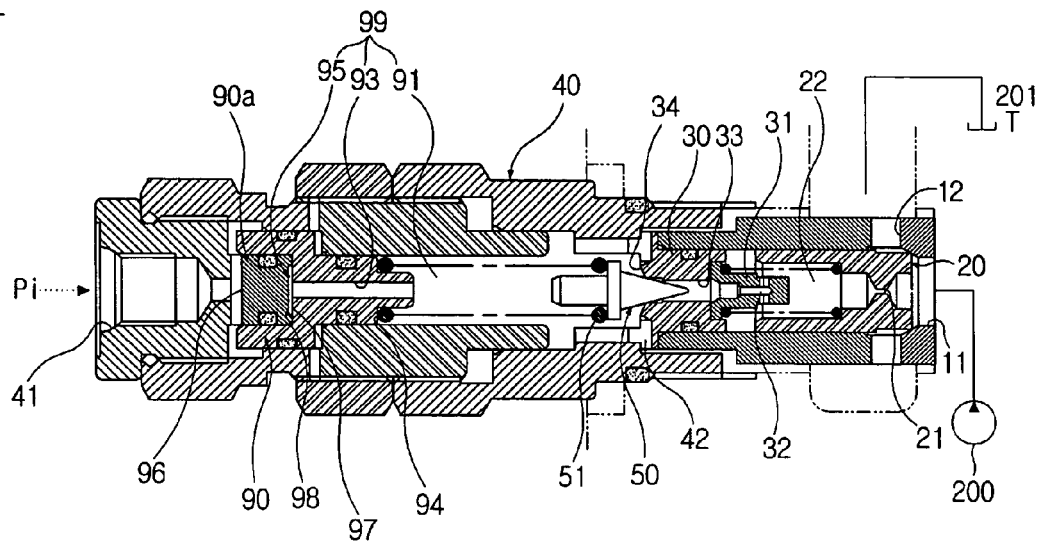
FIG. 5 is a cross-sectional view of a pilot operated relief valve according to a third embodiment of the present invention.

FIG. 5 is a cross-sectional view of a pilot operated relief valve 3 according to a third embodiment of the present invention. In the following description on the pilot operated relief valve according to the third embodiment of the present invention, repetition of the description on the same components as those of the first embodiment will be omitted.

The signal inlet 41 is installed on a rear end of the housing 40 like in the second embodiment. However, construction that a signal receiving surface 96 is formed at a rear surface of a piston 90 is different from the second embodiment. That is, an auxiliary piston 90a is movably inserted into the rear end of the piston 90 and the signal receiving surface 96 is formed at the rear end of the auxiliary piston 90a so as to serve to receive pilot signal pressure Pi inputted from the signal inlet 41.

When pilot signal pressure Pi is supplied to the signal receiving surface 96, the piston 90 is moved to the right side in the housing 40 together with the auxiliary piston 90a to press the pilot poppet spring 51 thus to change the setting pressure.

A balance system 99 is mounted on the housing 40 to offset tank pressure exerted on the piston 90. The balance system 99 includes a balance chamber 91 formed on the front surface of the piston 90 to be connected with the tank fluid channel 12, a balance fluid channel 93 passing through the center of the piston 90, and a balance back chamber 95 communicated with the balance chamber 91 through the balance fluid channel 93.

The balance back chamber 95 is formed as a space defined by a front end recess 98 formed at the front end of the auxiliary piston 90a and a rear pressure receiving surface 97 on the rear surface of the piston 90. The balance fluid channel 93 formed inside the piston 90 connects the balance back chamber 95 and the balance chamber 91 with each other.

Since the balance chamber 91 is connected with the tank fluid channel 12, hydraulic fluid supplied from the tank 201 via the tank fluid channel 12 is supplied to the balance back chamber 95 via the balance chamber 91 and the balance fluid channel 93. Tank pressure is formed in the balance chamber 91 and the balance back chamber 95, so that both sides of the front and rear of the piston 90, respectively receive the same tank pressure.

In order that the front and rear sides of the piston 90 are applied with same exertion force by tank pressure, the rear pressure receiving surface 97 of the piston 90 contacting the balance back chamber 95 should be preferably formed such that an area thereof has the same dimension as that of the front pressure receiving surface 94 of the piston 90 contacting the balance chamber 91.

Accordingly, even if tank pressure is changed, the balance system 99 offsets tank pressure exerted on the piston 90 so that tank pressure does not affect the setting pressure, which secures the function of relief valve.

Figure 6:
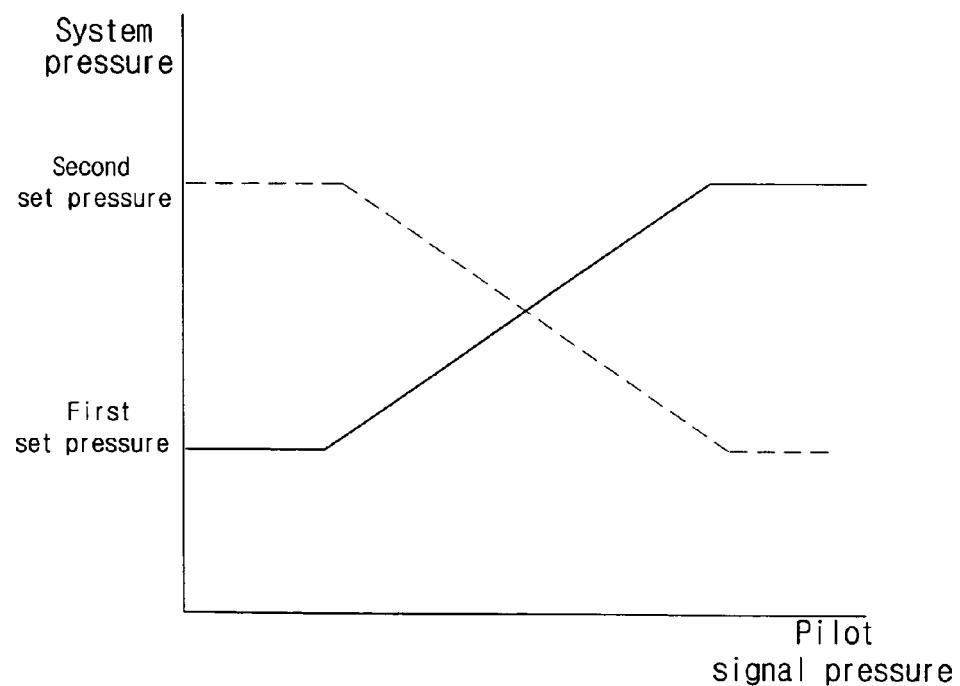
FIG. 6 is a characteristic diagram showing a relation between pilot signal pressure and system pressure of the pilot operated relief valve according to the present invention.

FIG. 6 is a characteristic diagram showing a relation between pilot signal pressure and system pressure of the pilot operated relief valve according to the present invention.

A dotted line shows a characteristic according to the foregoing first embodiment of the present invention and a solid line shows a characteristic according to the foregoing second and third embodiments.

When signal pressure Pi is inputted to the relief valve, in case of the first embodiment, the setting pressure of the relief valve 1 is changed from a second setting pressure of high pressure to a first setting pressure of low pressure, and in case of the second and third embodiment, it is changed from a first setting pressure of low pressure to a second setting pressure of high pressure.

In a state of the second setting pressure that the pilot poppet spring 51 is compressed so that the setting pressure is maintained at high pressure, the main poppet 20 is operated only when pressure supplied to the high-pressure inlet 11 from the hydraulic pump 200 exceeds the second setting pressure of high pressure preset by the pilot poppet spring 51, so that the setting pressure of the hydraulic system becomes a proper state in which a heavy equipment can implement working requiring high load such as excavating, turning, running and so on.

On the contrary, in a state of the first setting pressure that the pilot poppet spring 51 is extended and its spring force is reduced so that the setting pressure is maintained at low pressure, the main poppet 20 is operated only when pressure supplied to the high-pressure inlet 11 from the hydraulic pump 200 exceeds the first setting pressure of low pressure preset by the pilot poppet spring 51, so that the setting pressure of the hydraulic system is maintained at a normal state not requiring high load.

As shown in FIG. 6, when pressure is changed from the second setting pressure to the first setting pressure as pilot signal pressure Pi is supplied to the relief valves 1, 2 and 3, the setting pressures of the relief valves 1, 2 and 3 are not influenced by change of the tank pressure, which stably secures the function of the relief valves 1, 2 and 3.

As can be seen in the foregoing, according to the pilot operated relief valve of the present invention, even if tank pressure is changed, the balance system offsets tank pressure exerted on the piston so that the setting pressure of the pilot poppet is not changed, providing an effect of stably performing the function of the relief valve.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A pilot operated relief valve comprising:
   a sleeve provided with a high-pressure inlet to which hydraulic fluid from a pump is supplied, and a tank fluid channel through which the hydraulic fluid of the high-pressure inlet is returned to a tank;
   a main poppet provided in the sleeve so as to be communicated with the high-pressure inlet in a front thereof to allow the hydraulic fluid to be introduced into a back pressure chamber provided in a rear thereof, and to be resiliently supported by a main poppet spring to open/close the high-pressure inlet and the tank fluid channel;
   a seat provided with a seat fluid channel communicated with the back pressure chamber and provided in the sleeve;
   a housing provided with a signal inlet into which a pilot signal pressure is inputted and a tank inlet communicated with the tank fluid channel, and connected to the sleeve so as to be communicated with the seat fluid channel on a front end thereof;
   a pilot poppet resiliently supported to be movable in the housing by a pilot poppet spring, and provided to open/close the tank inlet and the seat fluid channel on a front end thereof;
   a piston movably provided in the housing to support a rear end of the pilot poppet spring, and pressing the pilot poppet spring by means of the pilot signal pressure inputted at the signal inlet; and
   a balance system having a balance chamber which is provided in a front of the piston within the housing and is connected with the tank fluid channel, a balance fluid channel passing through a center of the piston, and a balance back chamber communicated with the balance chamber through the balance fluid channel, and offsetting the tank pressure exerted on the piston.

2. The pilot operated relief valve as set forth in claim 1, wherein: the piston has an outer circumference provided with a signal receiving surface on which the pilot signal pressure from the signal inlet is exerted; the housing is therein provided with a piston spring resiliently supporting the piston against the pilot signal pressure; the balance back chamber is defined by a rear pressure receiving surface of the piston and an rear inner wall of the housing; the balance chamber comes into contact with a front pressure receiving surface of the piston; and the front pressure receiving surface of the piston has the same area as the rear pressure receiving surface of the piston.

3. The pilot operated relief valve as set forth in claim 1, wherein: the piston has a rear surface provided with a signal receiving surface on which the pilot signal pressure from the signal inlet is exerted; the balance back chamber is defined by a rear pressure receiving surface formed by a step of an outer circumference of the piston and an inner side wall of the housing; the balance fluid channel includes a vertical fluid channel communicated with the balance back chamber and a central fluid channel which branches off from the vertical fluid channel to be communicated with the balance chamber; the balance chamber comes into contact with a front pressure receiving surface of the piston; and the front pressure receiving surface of the piston has the same area as the rear pressure receiving surface of the piston.

4. The pilot operated relief valve as set forth in claim 1, wherein: the piston has a rear end into which an auxiliary piston is movably inserted; the auxiliary piston has a rear end provided with a signal receiving surface on which the pilot signal pressure from the signal inlet is exerted; the balance back chamber is defined by a recess on a front end of the auxiliary piston and a rear pressure receiving surface of a rear surface of the piston; the balance chamber comes into contact with a front pressure receiving surface of the piston; and the front pressure receiving surface of the piston has the same area as the rear pressure receiving surface of the piston.

* * * * *